US007628917B2

(12) United States Patent
Penezina et al.

(10) Patent No.: US 7,628,917 B2
(45) Date of Patent: Dec. 8, 2009

(54) POROUS COMPOSITE MEMBRANE AND METHOD FOR MAKING THE SAME

(75) Inventors: Oksana Penezina, Needham, MA (US); Manuel M. Pacheco, Billerica, MA (US); Dean T. Tsou, Lexington, MA (US)

(73) Assignee: Whatman, Inc. (GB)

( * ) Notice: Subject to any disclaimer, the term of this patent is extended or adjusted under 35 U.S.C. 154(b) by 0 days.

(21) Appl. No.: 10/646,292

(22) Filed: Aug. 22, 2003

(65) Prior Publication Data
US 2004/0242714 A1   Dec. 2, 2004

Related U.S. Application Data

(60) Provisional application No. 60/407,856, filed on Sep. 3, 2002.

(51) Int. Cl.
   *B01D 39/16*   (2006.01)
(52) U.S. Cl. .................... 210/500.35; 210/500.27; 210/500.33; 428/319.3; 428/319.7
(58) Field of Classification Search ............ 428/319.3, 428/319.7; 521/50, 27; 210/500.27, 500.33, 210/500.35, 500.36, 500.4, 500.42
   See application file for complete search history.

(56) References Cited

U.S. PATENT DOCUMENTS

| 4,618,533 | A | * | 10/1986 | Steuck ............... 428/315.7 |
| 4,917,793 | A | | 4/1990 | Pitt et al. ............... 210/94 |
| 4,973,493 | A | | 11/1990 | Guire ..................... 427/2 |
| 4,976,897 | A | * | 12/1990 | Callahan et al. ........ 264/425 |
| 4,979,959 | A | | 12/1990 | Guire .................... 623/66 |
| 5,002,582 | A | | 3/1991 | Guire et al. ............ 623/66 |
| 5,079,272 | A | | 1/1992 | Allegrezza, Jr. et al. ... 521/134 |
| 5,137,633 | A | * | 8/1992 | Wang .................... 210/490 |
| 5,158,721 | A | | 10/1992 | Allegrezza, Jr. et al. .... 264/22 |
| 5,209,849 | A | * | 5/1993 | Hu et al. ................ 210/490 |
| 5,217,492 | A | | 6/1993 | Guire et al. ............ 623/11 |
| 5,258,041 | A | | 11/1993 | Guire et al. ............ 623/66 |
| 5,263,992 | A | | 11/1993 | Guire .................... 623/66 |
| 5,414,075 | A | | 5/1995 | Swan et al. ............. 568/333 |
| 5,468,390 | A | | 11/1995 | Crivello et al. .......... 210/490 |

(Continued)

FOREIGN PATENT DOCUMENTS

CA         1305068         10/1987    ............ 204/91.09

(Continued)

OTHER PUBLICATIONS

Bach et al, "UV Refinish Primer and Clear Coat," 2002, 6 pages.*

(Continued)

*Primary Examiner*—Hai Vo
(74) *Attorney, Agent, or Firm*—Edwards Angell Palmer & Dodge LLP; David G. Conlin; Lisa Swiszcz Hazzard (57) ABSTRACT

The invention provides composite porous membranes comprising a porous hydrophobic substrate coated with difunctional surface-modifying molecules. The difunctional surface-modifying molecules provide a hydrophilic surface without forming branches of interconnected polymer molecules in the pores. The invention also provides a method for making composite porous membranes, such as a composite hydrophilic membrane with reduced concentration of surface modifying molecules required to coat a hydrophobic substrate.

29 Claims, 10 Drawing Sheets

U.S. PATENT DOCUMENTS

| | | | |
|---|---|---|---|
| 5,512,329 A | 4/1996 | Guire et al. | 427/508 |
| 5,563,056 A | 10/1996 | Swan et al. | 435/180 |
| 5,637,460 A | 6/1997 | Swan et al. | 435/6 |
| 5,714,360 A | 2/1998 | Swan et al. | 435/174 |
| 5,719,227 A * | 2/1998 | Rosenberry et al. | 524/590 |
| 5,741,551 A | 4/1998 | Guire et al. | 427/407.1 |
| 6,077,698 A | 6/2000 | Swan et al. | 435/174 |
| 6,183,901 B1 * | 2/2001 | Ying et al. | 429/129 |
| 6,193,077 B1 * | 2/2001 | Witham et al. | 210/490 |
| 6,299,653 B1 * | 10/2001 | Hoshi et al. | 29/623.1 |
| 6,780,327 B1 * | 8/2004 | Wu et al. | 210/660 |
| 6,783,937 B1 * | 8/2004 | Hou et al. | 435/6 |
| 2002/0161066 A1* | 10/2002 | Remigy et al. | 522/6 |
| 2003/0077435 A1* | 4/2003 | Charkoudian et al. | 428/304.4 |
| 2004/0197562 A1* | 10/2004 | Soane et al. | 428/411.1 |

FOREIGN PATENT DOCUMENTS

| | | | |
|---|---|---|---|
| CA | 1335721 | 12/1988 | 204/91.02 |
| EP | 0 326 579 B1 | 1/1995 | |
| EP | 0 407 390 B1 | 4/1996 | |
| EP | 0 585 436 B1 | 5/2000 | |
| EP | 0 425 485 B1 | 10/2000 | |
| WO | WO 88/02623 | 4/1988 | |
| WO | WO 0050160 A1 * | 8/2000 | |
| WO | WO 0050161 A1 * | 8/2000 | |

OTHER PUBLICATIONS

Hoffman, Letter to the Editor: A general classification scheme for "hydrophilic" and "hydrophobic" biomaterial surfaces, Journal of Biomedical Materials Research, 20:ix-xi (1986).

* cited by examiner

FIG. 1B

1-Hydroxy-cyclohexyl-phenyl-ketone
Molecular weight: 204.3

FIG. 2A

2-Benzyl-2-dimethylamino-1-(4-morpholinophenyl)-butanone-1

FIG. 2B

50 % 1-Hydroxy-cyclohexyl-phenyl-ketone (IRGACURE® 184)

50 % Benzophenone

FIG. 2C

25 % Bis(2,6-dimethoxybenzoyl)-2,4,4-trimethyl pentylphosphineoxide

75 % 2-Hydroxy-2-methyl-1-phenyl-propan-1-one (DAROCUR® 1173)

FIG. 2D

2,2-Dimethoxy-1,2-diphenylethan-1-one

FIG. 2E

Bis(2,4,6-trimethylbenzoyl)-phenylphosphineoxide

FIG. 2F

80 % 2-Hydroxy-2-methyl-1-phenyl-propan-1-one (DAROCUR® 1173)

20 % 1-Hydroxy-cyclohexyl-phenyl-ketone (IRGACURE® 184)

FIG. 2G

25 % Bis(2,6-dimethoxybenzoyl)-2,4,4-trimethyl-pentylphosphineoxide

75 % 1-Hydroxy-cyclohexyl-phenyl-ketone (IRGACURE® 184)

FIG. 2H

2-Hydroxy-2-methyl-1-phenyl-propan-1-one

FIG. 2I

Benzophenone

FIG. 2J

50 % 2,4,6-Trimethylbenzoyl-diphenyl-phosphineoxide

50 % 2-Hydroxy-2-methyl-1-phenyl-propan-1-one (DAROCUR® 1173)

FIG. 2K

Bis(.eta.5-2,4-cylcopentadien-1-yl)-bis
(2,6-difluoro-3-(1H-pyrrol-1-yl)-phenyl) titanium

FIG. 2L

2-Methyl-1[4-(methylthio)phenyl]-2-morpholinopropan-1-one

FIG. 2M

30% IRGACURE 369:

70% IRGACURE 651:

IRGACURE 369: 2-Benzyl-2-dimethylamino-1-(4-morpholinophenyl)-butanone-1

FIG. 2N

1-[4-(2-Hydroxyethoxy)-phenyl]-2-hydroxy-2-methyl-1-propane-1-one

FIG. 2O

POROUS COMPOSITE MEMBRANE AND METHOD FOR MAKING THE SAME

CROSS-REFERENCE TO RELATED APPLICATION

The present application claims priority of U.S. Provisional Application 60/407,856, filed Sep. 3, 2002, the disclosure of which is incorporated by reference herein.

FIELD OF THE INVENTION

The invention relates to a porous composite membrane with a hydrophilic surface and a method for making the same.

BACKGROUND OF THE INVENTION

Many synthetic polymeric membranes are made from hydrophobic polymers because they have desirable bulk properties such as flexibility, thermal stability, and chemical stability. However, the surfaces of such membranes are not suitable for applications requiring interactions with aqueous solutions, low protein adsorption, controlled ion exchange capacity, and controlled surface chemical reactivity.

It is often desirable to provide a porous membrane with a hydrophilic surface, which nevertheless retains the bulk properties of the underlying hydrophobic membrane. Such membranes are important in filtration applications that require the passage of aqueous fluids through the membranes. Additionally, porous hydrophilic membranes have important biological applications (e.g., as implantable medical devices), and use in assays relying on the capture and/or immobilization of biomolecules (e.g., nucleic acids or proteins) on a membrane surface. Therefore, the process of coating a hydrophobic surface should not diminish flow through efficiency of the membrane. Thus, processes that minimize pore clogging are essential for generating useful membranes comprising hydrophilic surfaces.

To render hydrophobic membranes hydrophilic, a wetting agent, such as a surface-active agent, can be added to a polymeric system being used to cast the membrane. Typically such coatings are only temporary, and the membrane so coated cannot be subjected to repeated wetting and drying procedures without loss of wettability. Further, exposure to any process fluid can generally extract the coating. This is particularly undesirable when processing biological fluids or contacting cells whose continued viability is desired.

Additional methods of casting membranes rely on the inclusion of hydrophilic cross-linkable monomers in a casting solution of dissolved hydrophobic polymer. Upon casting, a semi-crystalline polymer with hydrophilic surface properties is formed. See, e.g., U.S. Pat. Nos. 5,079,272 and 5,158,721.

Another method of preparing hydrophilic membranes involves graft polymerizing a hydrophilic monomer onto the surface of a porous hydrophobic polymeric membrane substrate. A typical example of a photochemical grafting process used to modify a hydrophobic surface with hydrophilic polymers is described in U.S. Pat. No. 5,468,390.

A number of patents also describe the covalent immobilization of hydrophilic polymers to a hydrophobic substrate using a photoreactive molecule covalently bound to the polymer, i.e., through a linking molecule. See, e.g., U.S. Pat. Nos. 4,973,493; 4,979,959; 5,002,582; 5,217,492; 5,258,041; 5,263,992; 5,414,075; 5,512,329; 5,563,056; 5,637,460; and 5,714,360.

Figure 1A:
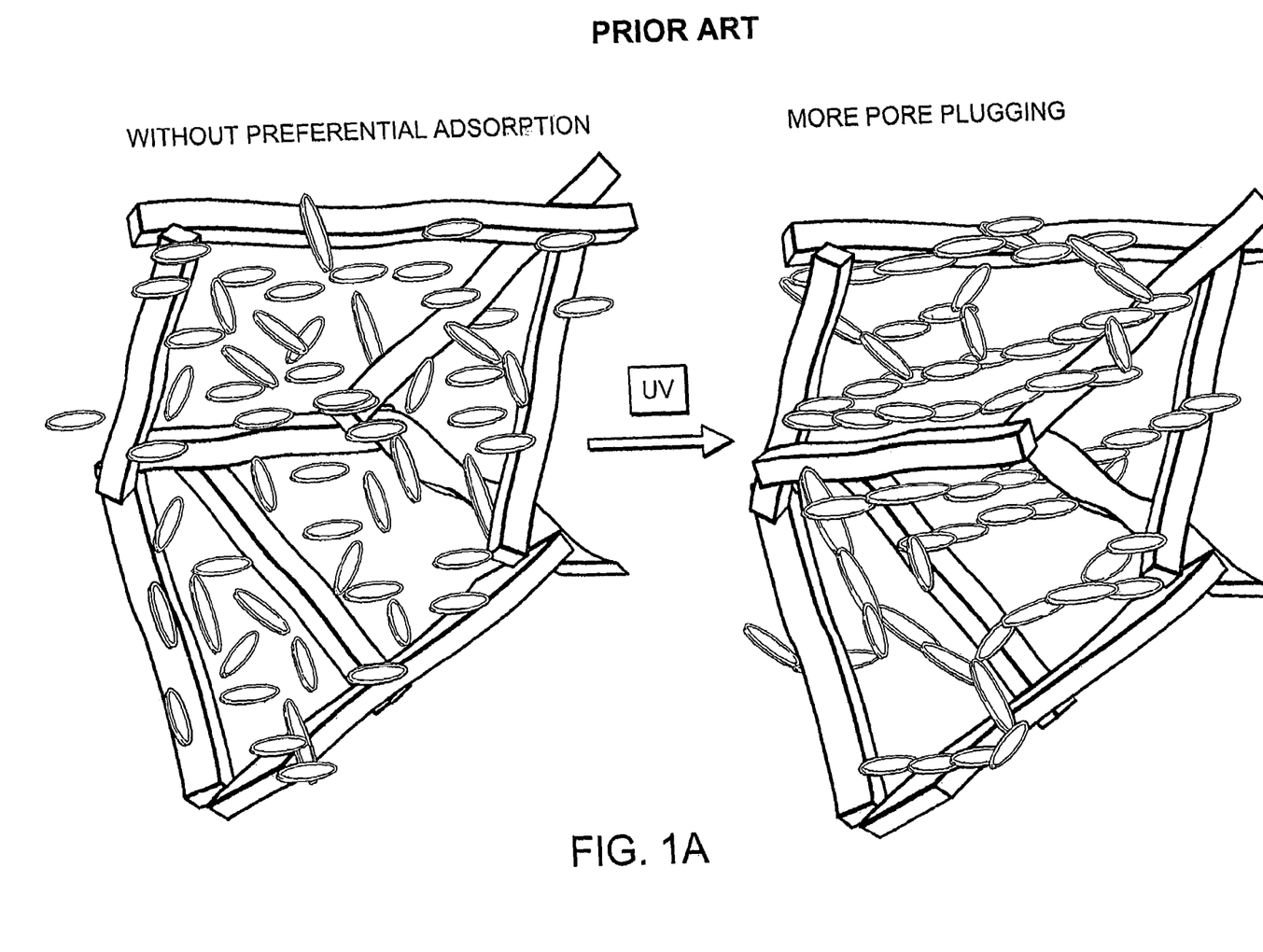

U.S. Pat. No. 4,917,793 discloses directly coating a cross-linked polymer having desired surface properties on porous polytetrafluoroethylene membrane. The polytetrafluoroethylene membrane is exposed to a reagent bath comprising a free radical polymerizable monomer, a polymerization initiator and cross-linking agent (e.g., such as a difunctional molecule) in a solvent comprising water and a water miscible, polar, organic solvent under conditions to effect free radical polymerization of the monomer and coating of the porous membrane with the cross-linked polymer. The use of chemical crosslinking reagents that are typically tetrafunctional, results in highly branched three-dimensional structures that reduce the membrane's flow-through efficiency by plugging pores. Generally, rapid pore blockage is associated with the formation of an interpenetrating network of cross-linked hydrophilic difunctional molecules in high concentrations (see, e.g., as shown in FIG. 1A).

Such a method of modifying hydrophobic surfaces with hydrophilic molecules generally has the disadvantage of trapping excessive polymer on the membrane. This phenomenon can rapidly plug membrane pores irreversibly, leading to a rapid decline in flow rate and an increase in pressure required to filter molecules through the membrane. Further, membranes produced have high levels of extactables and demand longer rinsing cycles. Additionally, processes for making such membranes may require significant amounts of coating monomer or polymer (e.g., 6-12%) and a long incubation time to achieve a uniformly coated surface.

SUMMARY OF THE INVENTION

In one aspect, the invention provides a composite porous membrane comprising a hydrophobic substrate (e.g., such as polyvinylidene fluoride or PVDF) stably associated with crosslinked network of difunctional surface modifying molecules. The difunctional surface-modifying molecules comprise a hydrophobic portion and a hydrophilic portion and are preferentially associated with substrate via their hydrophobic portions. Preferably, greater than about 10%, greater than about 20%, greater than about 30%, greater than about 40%, greater than about 50%, greater than about 60%, greater than about 70%, greater than about 80%, greater than about 90%, up to about 100% of the molecules associated with the substrate comprise the difunctional surface-modifying molecules. More preferably, all of the molecules associated with the substrate comprise difunctional surface-modifying molecules.

Suitable hydrophobic groups include, but are not limited to, hydrophobic alkyl, aromatic group, or olefinic hydrocarbon groups. In one preferred aspect, the aromatic group comprises a bisphenol A group. Preferably, the aromatic group does not form covalent bonds with the substrate.

Preferably, the hydrophilic portion of the surface-modifying molecules comprises at least two crosslinking active groups. More preferably, one group facilitates polymerization of the molecules, while the other group facilitates crosslinking between polymerized molecules. In one aspect, a crosslinking active group comprises a carbon-carbon double bond or another chemical group capable of free radical formation after hydrogen abstraction. Suitable hydrophilic groups comprise the general formula $[—X_{n1}—Y—CR=CH_2]_{n2}$ where X is independently selected from the group including, but not limited to, X=(—CH2-CH2-O—); (—CH2-O—);(—CH2-CH(COOH)—); (—CH2-CH (OH)—), Y can include, but is not limited to ([—CH2-]$_{n3}$); (—COO—); and $n_1$ is from about 1-50 while $n_2$ is from about 1-2. $n_3$ can be from about 1 to about 50.

Preferably, difunctional surface modifying molecules are polymerized on the substrate surface after preferentially absorbing to the substrate surface via the hydrophobic portions of the molecules.

In one aspect, difunctional surface-modifying molecules comprise difunctional acrylate molecules. In one particularly preferred aspect, the difunctional surface-modifying molecules comprise ethoxylated (30) bisphenol A diacrylates.

The preferred free radical initiator for the present invention consists of substantially hydrophobic ("phobic") molecule, capable of phobic-phobic interaction with a phobic surface of the substrate, resulting in the preferential adsorption of the photoinitiator molecule on the substrate surface prior to the exposure to the UV-irradiation.

Composite membranes according to the invention have an average pore size of from about 0.01 μm to 10 μm, i.e., are suitable for microfiltration. Composite membranes also can be designed to be suitable for ultrafiltration. Preferably, such membranes have molecular weight cutoff values of 10 kDa or less, 30 kDa, 50 kDa, 100 kDa, or higher and pore sizes less than 0.1 μm.

In one aspect, the membrane is wettable within less than about 30 seconds after drying upon contacting with an aqueous solution. Preferably, the membrane wets instantly after drying. Still more preferably, the membrane can withstand repeated cycles of wetting and drying. In a further aspect, the membrane is autoclavable.

The invention also provides a method for making a composite porous membrane with a hydrophilic surface. The method comprises providing a hydrophobic substrate and coating the hydrophobic substrate with difunctional surface modifying monomer molecules as described above, in the presence of a photoinitiator and a solvent. In one preferred aspect, coating is performed using a flow-through method. The reagent solution comprising difunctional surface-modifying monomer is forced through the hydrophobic substrate using a driving force (e.g., such as a pressure differential, centrifugal force, and the like), maximizing the amount of surface-modifying molecules deposited and preferentially absorbed on the substrate.

BRIEF DESCRIPTION OF THE FIGURES

The objects and features of the invention can be better understood with reference to the following detailed description and accompanying drawings.

FIG. 1A is a schematic diagram showing the formation of a membrane of the prior art (i.e., without preferential adsorption). A porous hydrophobic substrate, indicated as heavy lined inter-crossing fibers in the Figure, is exposed to a solution comprising surface-modifying molecules (shown as thin lined ellipses). Random, non-preferential association of the surface-modifying molecules with the substrate occurs, and the molecules are as likely to remain in solution as to become affixed to the substrate. Exposure to ultraviolet (UV) light causes the surface-modifying molecules to polymerize (illustrated by the end-to-end association between the surface-modifying molecules). In addition, crosslinking between the polymers causes the rapid formation of an interpenetrating network of cross-linked molecules. As can be seen from the Figure, this leads to rapid plugging of pores in the substrate (illustrated as open spaces between the fibers).

FIG. 1B shows formation of a composite membrane according to one aspect of the invention (i.e., with preferential adsorption). A porous hydrophobic substrate is exposed to difunctional surface molecules comprising a hydrophobic portion and a hydrophilic portion. These molecules preferentially absorb to the substrate via the hydrophobic portions of the molecules and therefore are more likely to be retained on the substrate than the surface-modifying molecules shown in FIG. 1A. Polymerization upon exposure to UV light results in more surface-modifying molecules on the substrate surface, and therefore crosslinking results in few, if any, polymer chains plugging the pores of the substrate. Providing hydrophobic photoinitiator molecules to facilitate the polymerization and cross-linking process enhances this effect. Such molecules are preferentially deposited on the substrate and therefore initiate polymerization on the substrate rather than across pores as shown in FIG. 1A.

FIGS. 2A-2O show exemplary hydrophobic photoinitiator molecules that can be used in methods of the invention. For mixtures, percentages are given by weight.

DETAILED DESCRIPTION

In one aspect, the invention provides composite porous membranes comprising a porous hydrophobic substrate coated with difunctional surface-modifying molecules. The difunctional surface-modifying molecules provide a hydrophilic surface without affecting the desirable bulk properties of the underlying substrate. The invention also provides a method for making composite porous membranes, such as a composite hydrophilic membrane with reduced concentration of surface-modifying molecules required to coat a substrate to the levels not practiced before in the art.

Definitions

The following definitions are provided for specific terms which are used in the following written description.

As used in the specification and claims, the singular form "a", "an" and "the" include plural references unless the context clearly dictates otherwise. For example, the term "a molecule" also includes a plurality of molecules.

The term "pore size" refers to the minimum size of particles that will be retained on the membrane. Thus, a membrane with a pore size of about 0.45 microns means that particles greater than about 0.45 microns will be retained on the membrane, those less than about 0.45 microns will pass through and will not be retained.

As used herein, "a difunctional surface-modifying molecule" refers to a molecule which comprises a hydrophobic portion and a hydrophilic portion and at least two crosslinking active groups.

As used herein, a "crosslinking active group" refers to a chemical group (e.g., such as a carbon-carbon double bond) which is capable of undergoing free radical polymerization.

As used herein, "preferential absorption" with respect to a difunctional surface-modifying molecule refers to the preference of the molecule to remain on a hydrophobic substrate once it has contacted the substrate. At any given time, there will be more preferentially absorbed surface molecules on a surface than there would be non-preferentially absorbed surface molecules on a comparable surface.

As used herein, "stably associated" with a substrate refers to an interaction between polymerized, crosslinked surface-modifying molecules and a substrate that remains intact after one or more washes in an aqueous solution and/or an organic solvent (such as an alcohol), and preferably, remains intact, after at least about 5, or at least about 10 washes. Preferably, a molecule which is "stably associated" with a substrate is one which remains attached to the substrate after exposure to at least about 90° C., for at least about 2 hours. "Stable associations" can be monitored by evaluating the wettability (i.e., hydrophillicity) of a substrate which is coated with difunctional surface-modifying molecules according to the invention.

As used herein, "wettable" refers to a membrane which is wetted across its entire surface without phobic patches.

As used herein, "a flow-through method" refers to a method where a solution is flowed through a substrate to coat the substrate with the solution.

Surface-Modifying Molecules

Preferably, the difunctional surface-modifying molecules comprise a hydrophilic portion and a hydrophobic portion. The surface-modifying molecules form hydrophobic interactions with the substrate via the hydrophobic portion of the molecules and form substantially no covalent bonds with the surface (e.g., less than about 1%, and preferably, less than about 0.1%, or less than about 0.01% of the molecules on the substrate are covalently bonded to the substrate). Generally, the surface modifying molecules also form substantially no ionic bonds with the surface.

In one particularly preferred aspect, the difunctional molecule comprises the general formula F-R where F represents the hydrophobic portion of the surface-modifying molecule and R represents the hydrophilic portion.

In one aspect, F is a hydrophobic alkyl, aromatic group, or olefinic hydrocarbon group. Preferably, F is selected from the group consisting of a hydrocarbon backbone (straight chained, branched or cyclic) having at least six carbons and preferably, up to about 50 carbons. In one preferred embodiment, F comprises an aromatic hydrocarbon molecule, or a substituted form thereof. Exemplary aromatic hydrocarbon molecules include, but are not limited to, phenols, benzyls, benzoyls, naphthyls; substituted forms thereof; and combinations thereof. In one particularly preferred embodiment, F is a bisphenol A. Preferably, F does not comprise hydroxyl, carboxyl or amino groups, i.e., F is not capable of covalently bonding to the substrate.

Preferably, R comprises at least two crosslinking active groups. Preferably, at least one of the groups comprises a carbon-carbon double bond. R may be positively charged, negatively charged, or nonionic, depending on the desired properties of the membrane (for example, a membrane for capturing and immobilizing nucleic acids, preferably comprises positively charged hydrophilic groups). Suitable R groups include, but are not limited to, acrylates, which may optionally include one or more alkyl groups, cyclic ring groups containing one of more hetero atoms, and hydrophilic groups, such as hydroxy, ethoxy, carboxy or amino groups.

Suitable hydrophilic groups comprise the general formula [—$X_{n1}$—Y—CR=$CH_2$]$_{n2}$ where X is independently selected from the group including, but not limited to, X=(—CH2-CH2-O—); (—CH2-O—);(—CH2-CH(COOH)—); (—CH2-CH(OH)—), Y can include, but is not limited to ([—CH2-]n3); (—COO—); and $n_1$ is from about 1-50 while $n_2$ is from about 1-2. $n_3$ can be from about 1 to about 50.

However, these are only exemplary atoms that might be used, and it should be obvious to those of skill in the art that others might be substituted, so long as the hydrophilic nature of R is maintained, and that such substitutions are encompassed within the scope of the invention.

A general classification scheme for "hydrophilic" and "hydrophobic" biomaterial surfaces is provided in J. Biol. Mat. Res. 20, pp. ix-xi (1986).

Figure 1B:
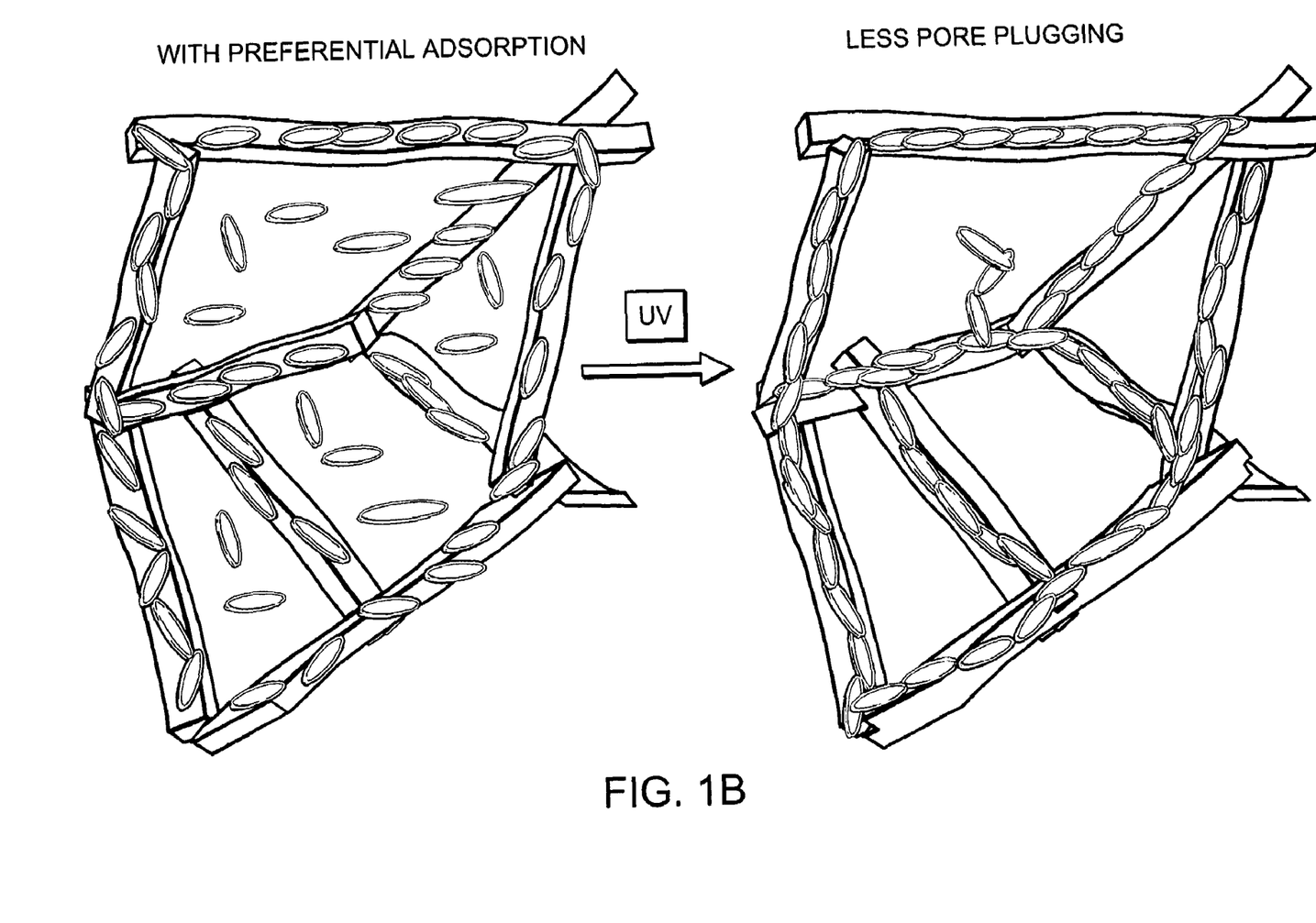

The difunctional surface-modifying molecules according to the invention are coated on the surface as monomers in solution and then polymerized using a free radical initiator, such as a photoinitiator (also free in solution), which adds free radicals to the carbon-carbon double bonds of the surface-modifying molecules. Both the surface-modifying molecule and the photoinitiator molecules are preferentially adsorbed on the substrate surface prior to cross-linking. As shown in FIG. 1B, this enhances the efficiency of the coating process, since surface-modifying molecules are more likely to remain on the surface of the substrate than not, and can interact highly efficiently with photoinitiator molecules which are also preferentially deposited and concentrated on the substrate surface.

Polymerization takes place across the crosslinking active groups, as surface-modifying molecules comprising free radicals interact with other surface-modifying molecules at their crosslinking groups. The result is the formation of a polymeric network on the surface of the substrate with hydrophilic properties.

Because of the preferential absorption of surface-modifying molecules on the substrate surface, as well as the preferential absorption of photoinitiators on the substrate surface, crosslinking between polymerized molecules is less likely to form the inter-connecting networks shown in seen for membranes of the prior art (see, e.g., FIG. 1A), and therefore less pore plugging. Preferably, the pore sizes of the coated membrane are substantially the same as the pore sizes of the hydrophobic substrate.

In one particularly preferred embodiment, the difunctional surface-modifying molecules are ethoxylated (30) bisphenol A diacrylates which are available from Sartomer (Oaklands Corporate Center, Exton Pa. 19341) under catalog number CD9038. While mono-functional hydrophilic acrylate monomers are usually used to hydrophilize a hydrophobic membrane surface. Only minute amounts of difunctional acrylate monomers are used as cross-linking agent. It is a discovery of the instant invention that by using difunctional acrylate monomers predominantly, if not exclusively, membrane hydrophilization can be achieved using much less reagent. Reducing the amount of reagents used provides two advantages: (1) less pore plugging and (2) reduced down stream washing requirements. Judicious selection of a difunctional acrylate monomer with a hydrophobic section within the molecule, promotes the hydrophobic-hydrophobic interaction between the difunctional acrylate and the membrane surface, thereby increasing the efficiency of the hydrophilization process.

Surface-modifying molecules according to the invention may have one or more of the following properties: resistance to degradation upon exposure to aqueous solutions, such as biological solutions; resistance to degradation by solvents; biocompatibility (e.g., membrane surfaces should not induce significant: platelet adhesion, interfere with the normal clotting mechanism; or cause any significant damage to the cellular elements or soluble components of the blood); and minimal pore clogging. Preferably, composite membranes comprising surface-modifying molecules according to the invention are chemically inert.

Hydrophobic Substrates

Suitable hydrophobic porous substrates include, but are not limited to: polyvinylidene fluoride (PVDF), polyvinyl fluoride (PVF), polytetrafluoroethylene (PTFE), fluorinated ethylene propylene (FEP), polystyrene, polysulfone, polyethersulfone, Polycarbonates (PC), Polyetheretherketone (PEEK), Polyetherimide (PEI), Polymethylpentene (PMP), Polyphylene Oxide (PPO), Polyphenylene Sulfide (PPS), Polyvinyl Chloride (PVC), PolyStyrene-Acrylonitrile (SAN), polyolefins (e.g., such as polyethylene or polypropylene), polyester substrates, (e.g., such as Polyethylene Terephthalate (PET) and Polybutylene Terephthalate (PBT)), copolymers of ethylene and tetrafluroethylene (ETFE), copolymers of ethylene and chlorotrifluroethylene (ECTFE), copolymers of PVDF with chlorotrifluoroethylene (CTFE); and copolymers of TFE, HFP and vinylidene fluoride (VDF). The substrate may comprise fibers that may be woven or non-woven. In one aspect, the hydrophobic substrate is a multilayer substrate comprising a hydrophobic surface (e.g., the substrate may comprise an organic polymer such as PMMA, aliphatic polyurethane, or a polyolefin copolymer having a fluoropolymer surface layer).

The substrate may be in the form of a membrane, a film, a web, a mesh, a fabric, a matrix, and more generally is in any form that provides a surface. The particular form or use of the substrate is not intended to be a limiting aspect of the invention.

Substrates (and the composite membranes formed from these substrates) may be characterized by their hydraulic permeability and sieving coefficient. In one aspect, a hydrophobic substrate has a hydraulic permeability for water, at 25° C., of at least about 10.0 ml/m²/hr/cmHg. "Hydraulic permeability" is defined as the volume of a solvent transported through the membrane under the influence of a pressure gradient. In one aspect, hydrophobic substrates according to the invention have an average pore size of from about 0.01 μm to 10 μm, i.e., are suitable for microfiltration. Membranes also can be provided which are suitable for ultrafiltration. Preferably, such membranes have molecular weight cutoff values of 10 kDa or less, 30 kDa, 50 kDa, 100 kDa, or higher and pore sizes less than 0.1 μm. Pores may have uniform sizes on average or may comprise varying sizes.

In one aspect, a hydrophobic substrate according to the invention has a minimum flow rate of 10 ml/min/cm², for a 0.2 μm pore size, under a pressure, of 10 psi.

In one preferred aspect, the hydrophobic substrate is a membrane which is formed as a thin sheet (e.g., approximately 80-150 μm, preferably, about 120 μm) of substantially uniform thickness.

In preferred aspect, a hydrophobic substrate according to the invention comprises a PVDF membrane. PVDF membranes are commercially available with average pore sizes (i.e., pore diameters) in the range from about 0.05 μm to about 10.0 μm. The smallest of these conventional pore sizes will retain some large viruses and most bacteria. A conventionally-produced PVDF membrane is disclosed by Mahoney, in U.S. Pat. No. 5,013,339.

Methods of Making Composite Membranes

The invention further provides a method for making a composite porous membrane comprising a hydrophobic substrate and a hydrophilic surface. In one aspect, a hydrophobic porous membrane is rendered hydrophilic in a continuous process by coating directly in a flow through mode with preferentially absorbing monomeric difunctional surface-modifying molecules, and photoinitiator molecules such as those described above.

The difunctional surface-modifying molecules have integral hydrophobic regions in the molecules which form associations with the substrate, facilitating preferential absorption of the surface-modifying molecules on the substrate. The hydrophilic portions of the surface-modifying molecules are extended away from the substrate, providing a hydrophilic surface on the substrate while maintaining the underlying porous structure of the substrate.

In one aspect, a hydrophobic substrate, such as a PVDF membrane, is treated with a reagent bath containing difunctional surface-modifying molecules. As used herein, "treated" refers to forcing the solution through the membrane for sufficient periods of time to coat the substrate with the difunctional surface-modifying molecule and the photoinitiator molecules. Preferably, the bath additionally comprises a solvent to facilitate wetting, and to dissolve the difunctional surface-modifying molecule and also a mixture of suitable solvents, such as, for example, a mixture of water with an alcohol, can be used.

Figure 2A:
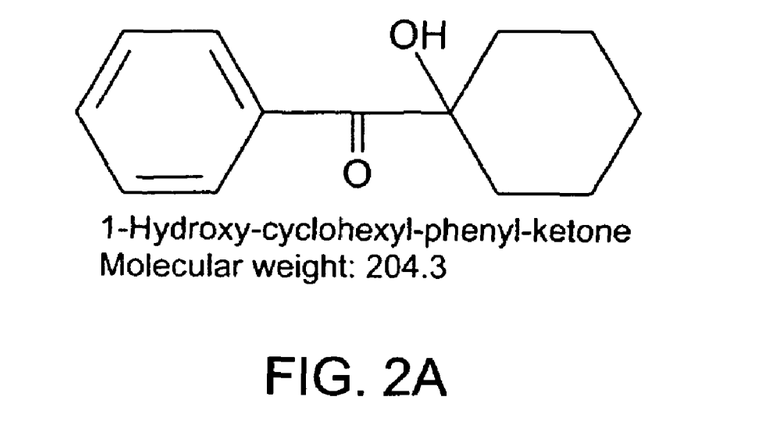
FIG. 2A shows the chemical structure of 1-hydroxy-cyclohexyl-phenyl-ketone (molecular weight 204.3; Ciba Specialty Chemicals; Ciba® IRGACURE® 184; CAS No. 947-19-3).
Figure 2B:
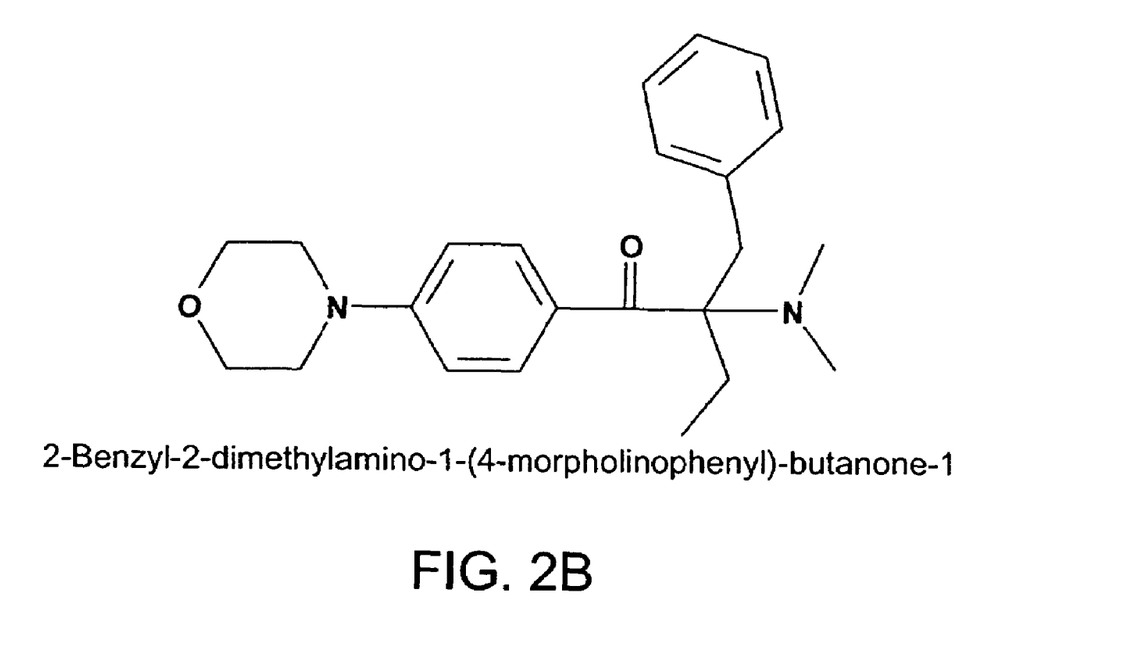
FIG. 2B shows the chemical structure of 2-benzyl-2-dimethylamino-1-(4-morpholinophenyl)-butanone-1 (molecular weight 366.5; Ciba Specialty Chemicals; Ciba® IRGACURE® 369; CAS No. 119313-12-1).
Figure 2C:
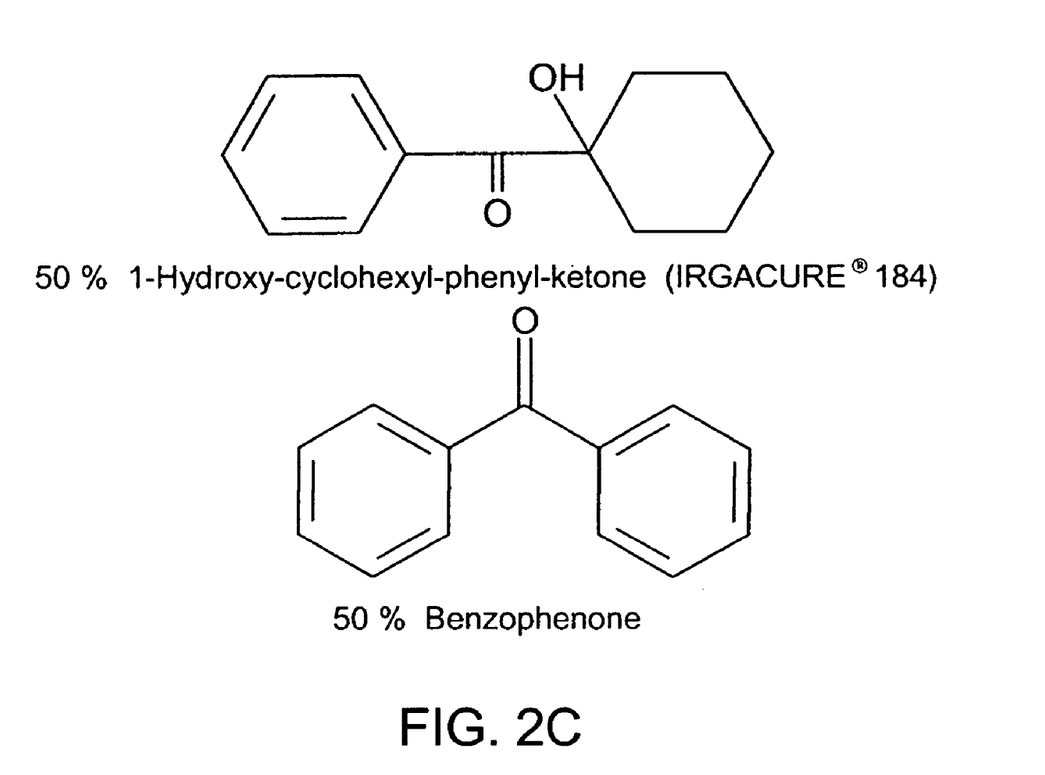
FIG. 2C shows the chemical structures of 1-hydroxy-cyclohexyl-phenyl-ketone (top; see also FIG. 2A) and benzophenone (bottom; see also FIG. 2J), which may be used as a mixture (e.g., 50% 1-hydroxy-cyclohexyl-phenyl-ketone and 50% benzophenone (w/w); Ciba Specialty Chemicals; Ciba® IRGACURE® 500).
Figure 2D:
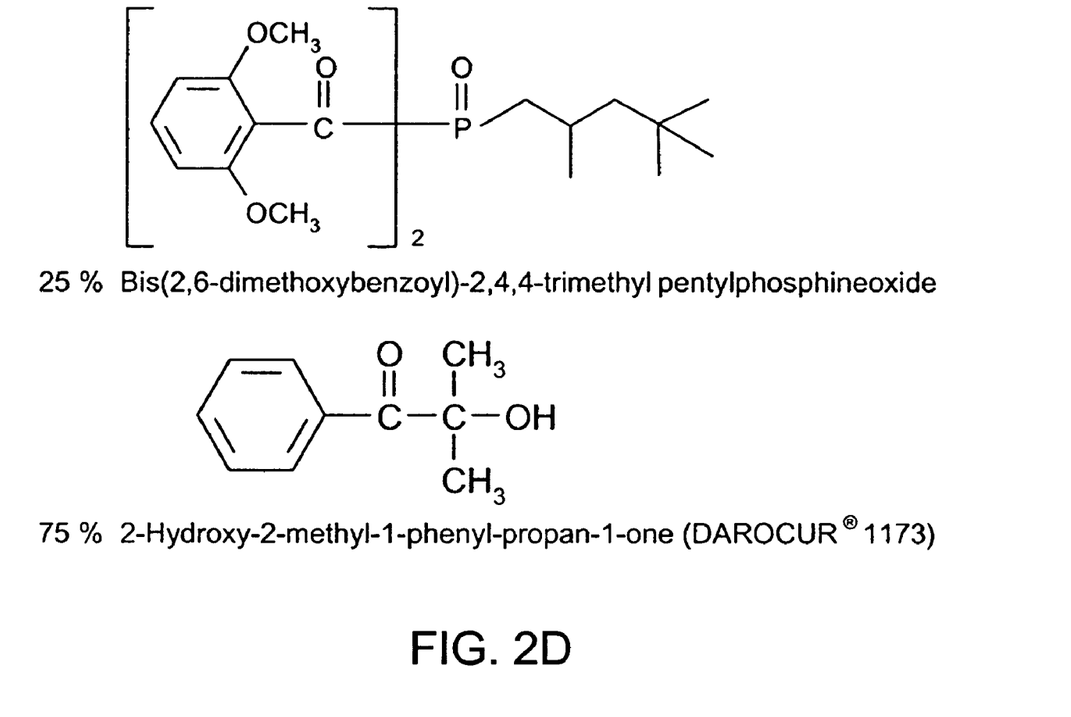
FIG. 2D shows the chemical structures of bis(2,6-dimethoxybenzoyl)-2,4,4-trimethyl pentyl phosphineoxide (top) and 2-hydroxy-2-methyl-1-phenyl-propan-1-one (bottom; see also FIG. 2I), which may be used as a mixture (e.g., 25% bis(2,6-dimethoxybenzoyl)-2,4,4-trimethyl pentyl phosphineoxide and 75% 2-hydroxy-2-methyl-1-phenyl-propan-1-one (w/w); Ciba Specialty Chemicals; Ciba® IRGACURE® 1700).
Figure 2E:
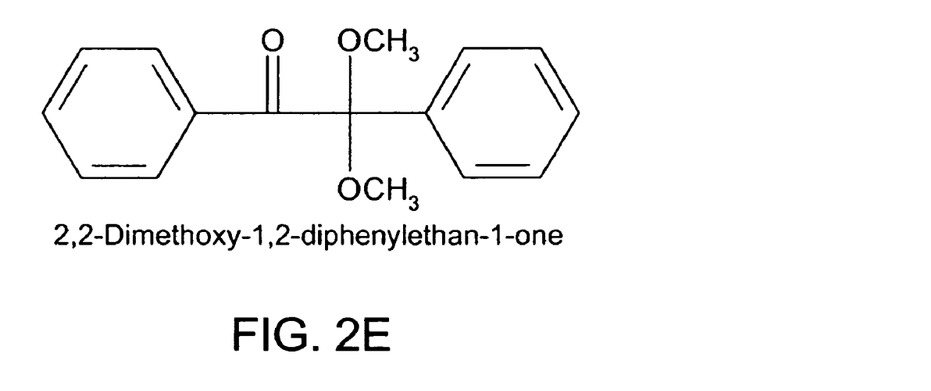
FIG. 2E shows the chemical structure of 2,2-dimethoxy-1,2-diphenylethan-1-one (molecular weight 256.3; Ciba Specialty Chemicals; Ciba® IRGACURE® 651; CAS No. 24650-42-8).
Figure 2F:
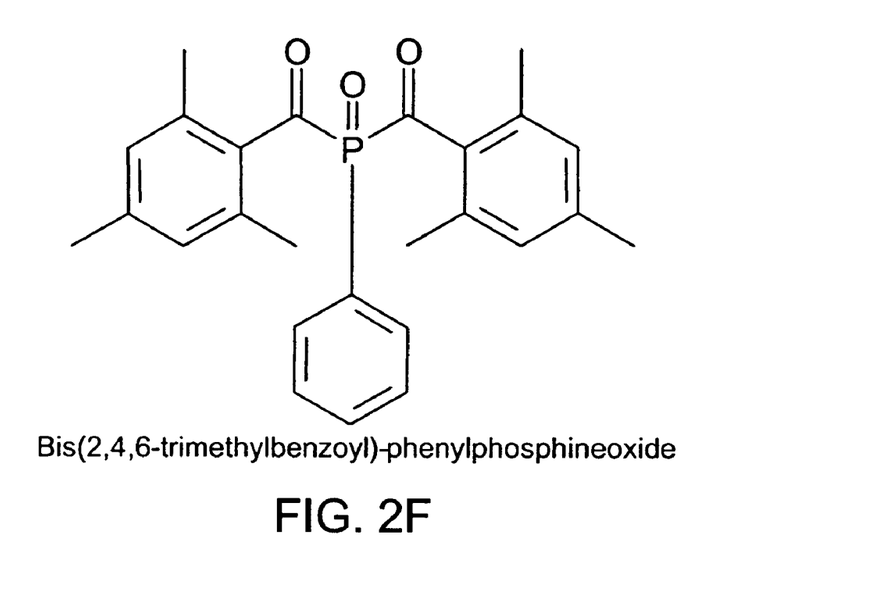
FIG. 2F shows the chemical structure of bis(2,4,6-trimethylbenzoyl)-phenylphosphineoxide (molecular weight 418.5; Ciba Specialty Chemicals; Ciba® IRGACURE® 819; CAS No. 162881-26-7).
Figure 2G:
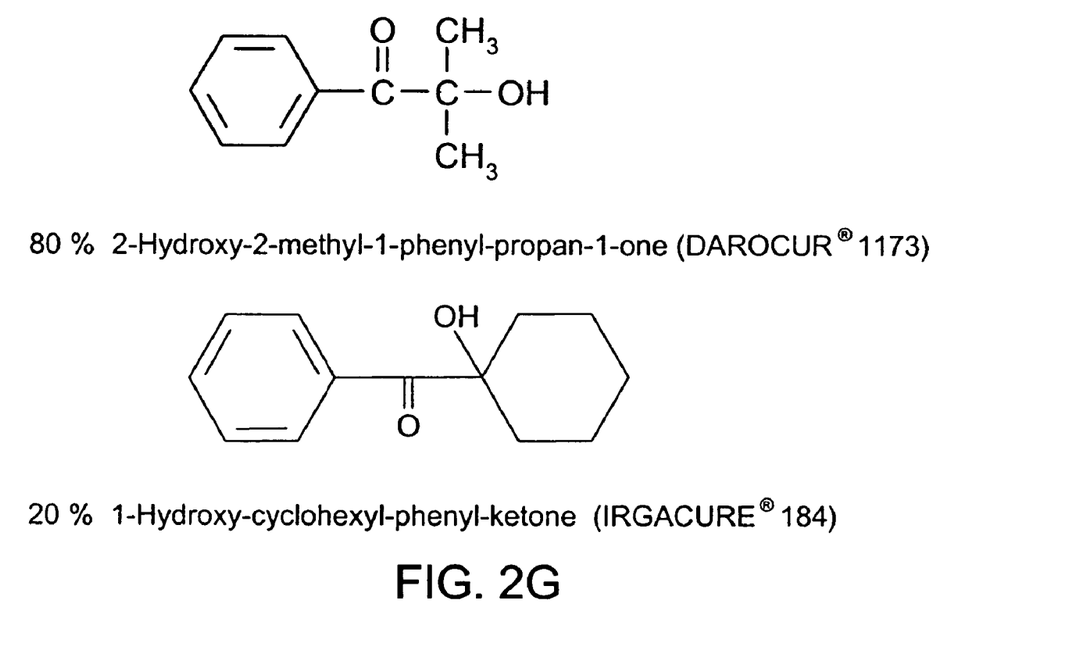
FIG. 2G shows the chemical structures of 2-hydroxy-2-methyl-1-phenyl-propan-1-one (top; see also FIG. 2I) and 1-hydroxy-cyclohexyl-phenyl-ketone (bottom; see also FIG. 2A), which may be used as a mixture (e.g., 80% 2-hydroxy-2-methyl-1-phenyl-propan-1-one and 20% 1-hydroxy-cyclohexyl-phenyl-ketone (w/w); Ciba Specialty Chemicals; Ciba® IRGACURE® 1000).
Figure 2H:
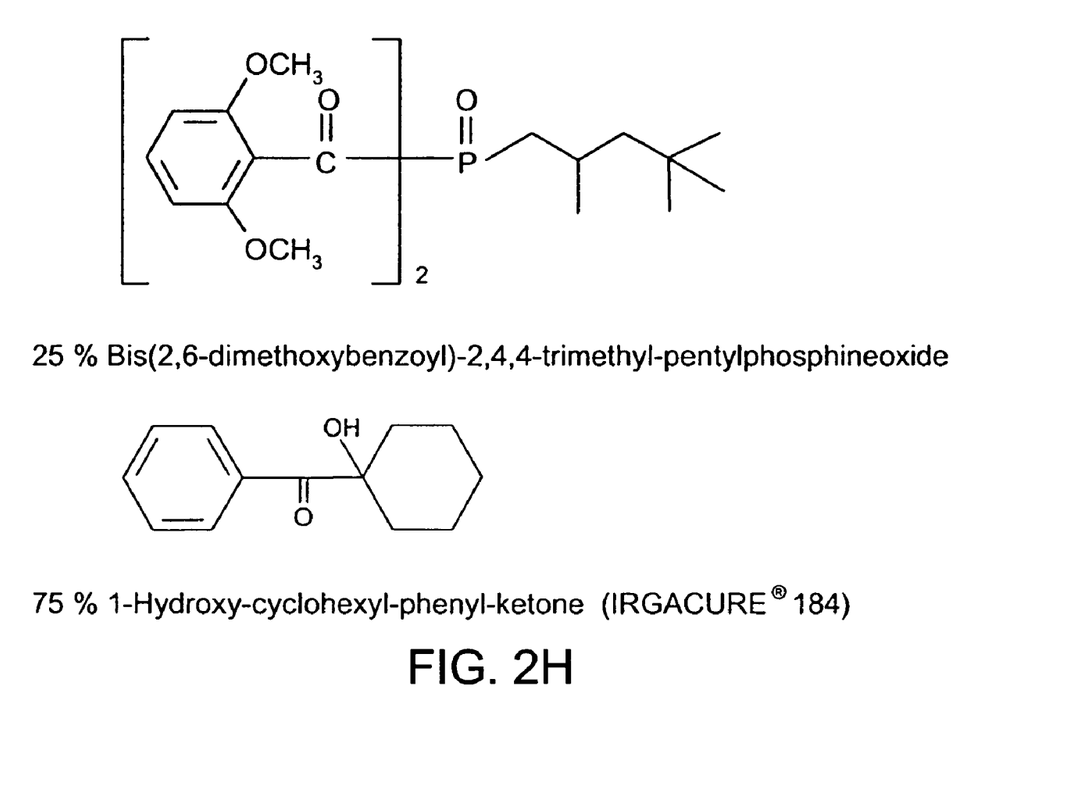
FIG. 2H shows the chemical structures of bis(2,6-dimethoxybenzoyl)-2,4,4-trimethyl-pentylphosphineoxide (top) and 1-hydroxy-cyclohexyl-phenyl-ketone (bottom; see also FIG. 2A), which may be used as a mixture (e.g., 25% bis(2,6-dimethoxybenzoyl)-2,4,4-trimethyl-pentylphosphineoxide and 75% 1-hydroxy-cyclohexyl-phenyl-ketone (w/w); Ciba Specialty Chemicals; Ciba® IRGACURE® 1800).
Figure 2I:
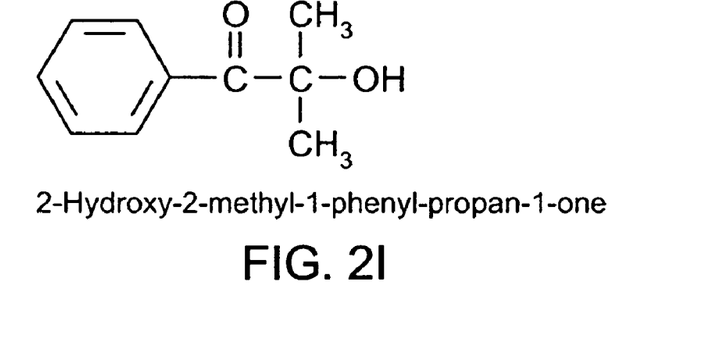
FIG. 2I shows the chemical structure of 2-hydroxy-2-methyl-1-phenyl-propan-1-one (molecular weight 164.2; Ciba Specialty Chemicals; Ciba® DAROCUR® 1173; CAS No. 7473-98-5).
Figure 2J:
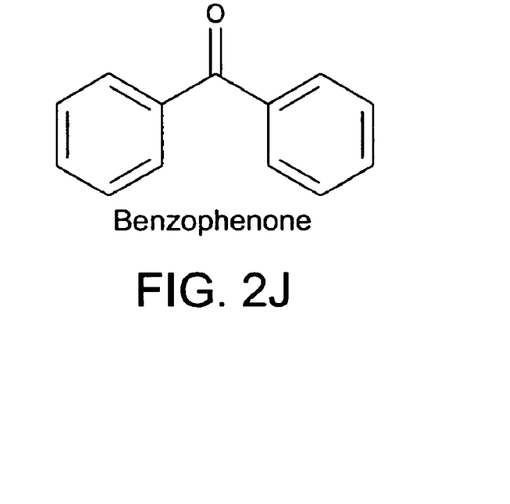
FIG. 2J shows the chemical structure of benzophenone (molecular weight 182.2; Ciba Specialty Chemicals; Ciba® DAROCUR® BP; CAS No. 119-61-9).
Figure 2K:
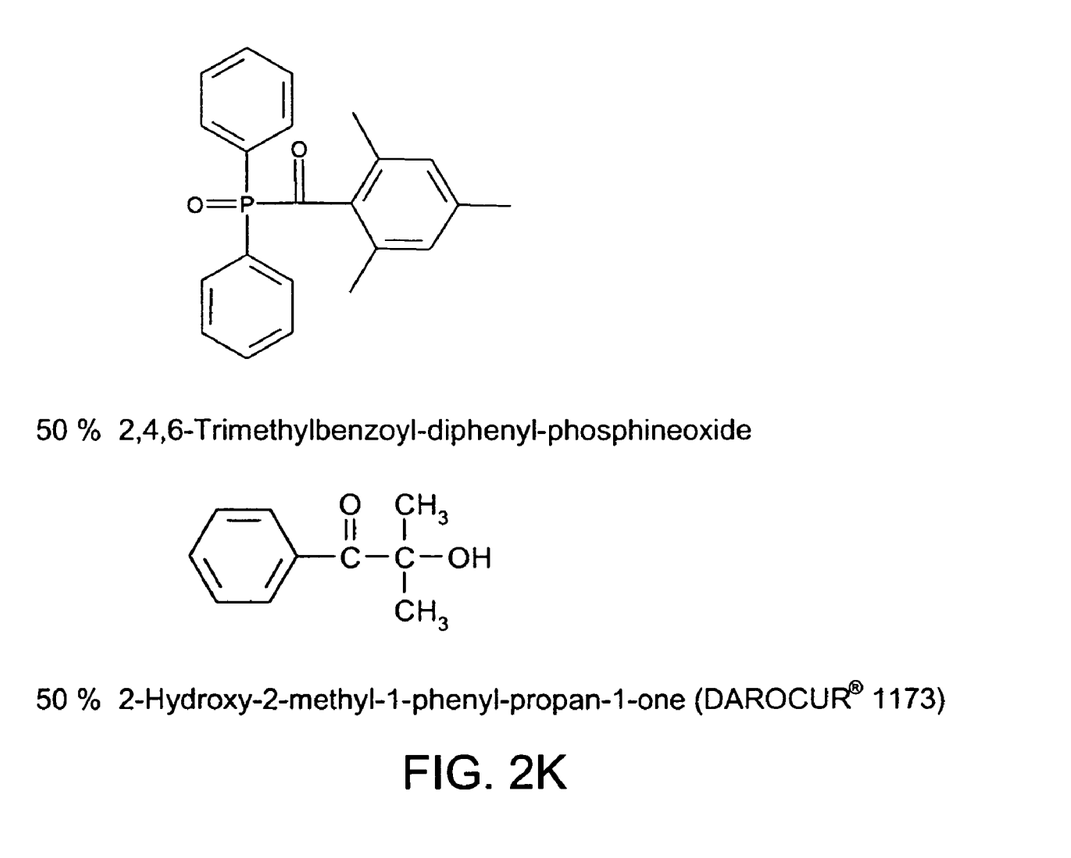
FIG. 2K shows the chemical structures of 2,4,6-trimethyl-benzoyl-diphenyl-phosphineoxide (top) and 2-hydroxy-2-methyl-1-phenyl-propan-1-one (bottom; see also FIG. 2I), which may be used as a mixture (e.g., 50% 2,4,6-trimethyl-benzoyl-diphenyl-phosphineoxide and 50% 2-hydroxy-2-methyl-1-phenyl-propan-1-one (w/w); Ciba Specialty Chemicals; Ciba® DAROCUR® 4265; CAS Nos. 75980-60-8 and 7473-98-5).
Figure 2L:
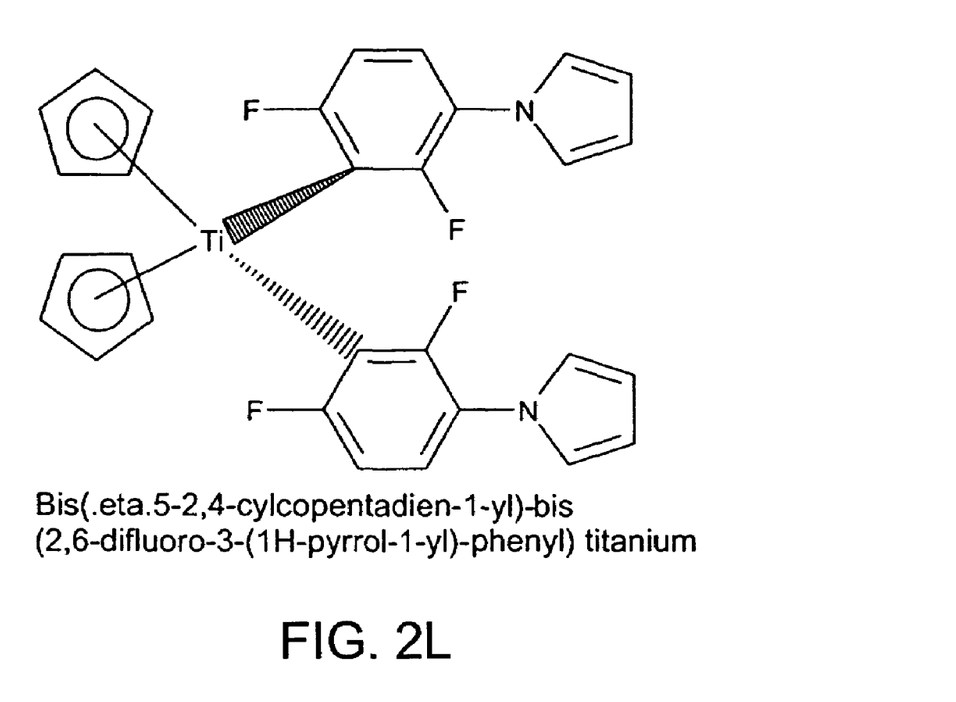
FIG. 2L shows the chemical structure of bis($\eta$-5-2,4-cyclopentadien-1-yl)-bis(2,6-difluoro-3-(1H-pyrrol-1-yl)-phenyl) titanium (molecular weight 534.4; Ciba Specialty Chemicals; Ciba® IRGACURE® 784; CAS No. 125051-32-3).
Figure 2M:
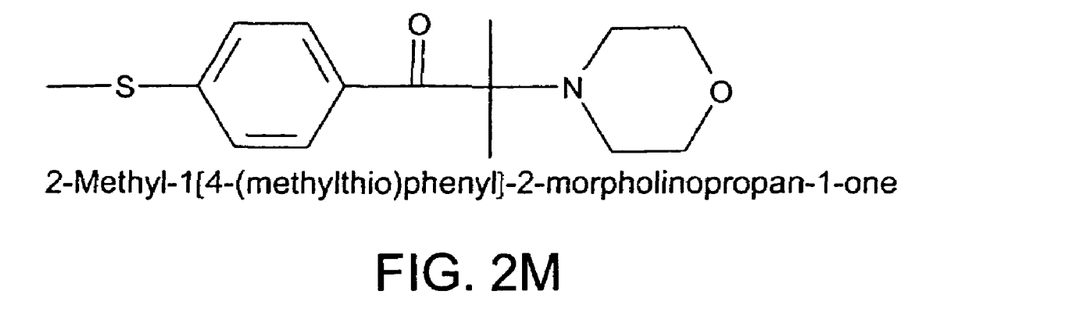
FIG. 2M shows the chemical structure of 2-methyl-1[4-(methylthio)phenyl]-2-morpholinopropan-1-one (molecular weight 279.4; Ciba Specialty Chemicals; Ciba® IRGACURE® 907; CAS No. 71868-10-5).
Figure 2N:
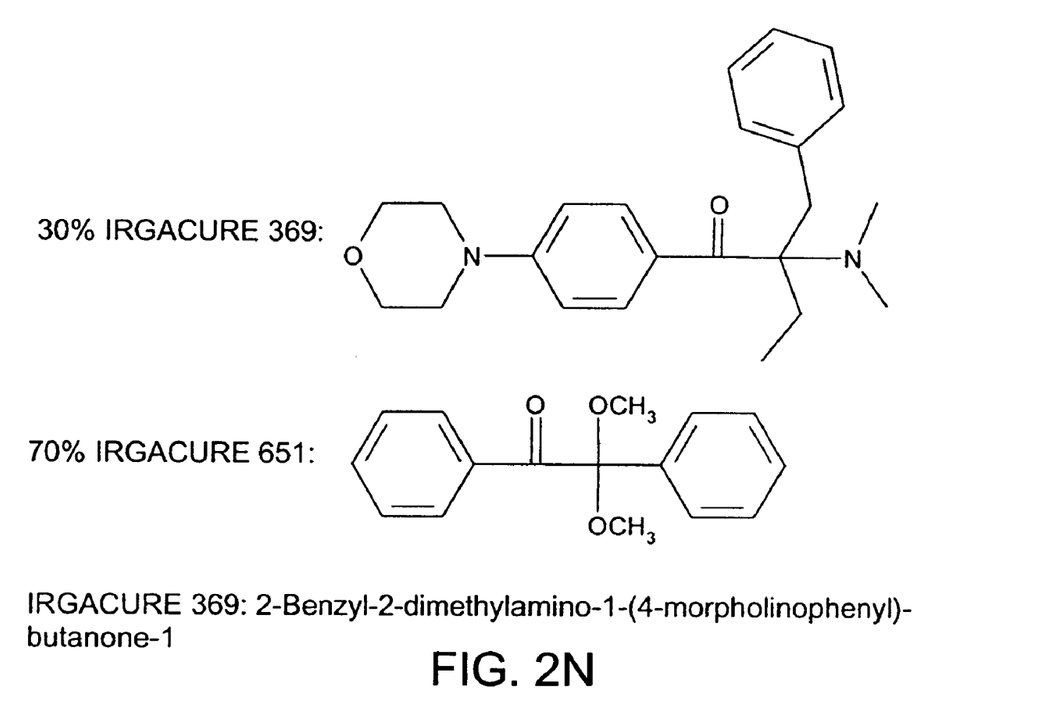
FIG. 2N shows the chemical structures of 2-benzyl-2-dimethylamino-1-(4-morpholinophenyl)-butanone-1 (top; see also FIG. 2B) and 2,2-dimethoxy-1,2-diphenylethan-1-one (bottom; see also FIG. 2E), which may be used as a mixture (e.g., 30% 2-benzyl-2-dimethylamino-1-(4-morpholinophenyl)-butanone-1 and 70% 2,2-dimethoxy-1,2-diphenylethan-1-one (w/w); Ciba Specialty Chemicals; Ciba® IRGACURE® 1300; CAS Nos. 119313-12-1 and 24650-42-8).
Figure 2O:
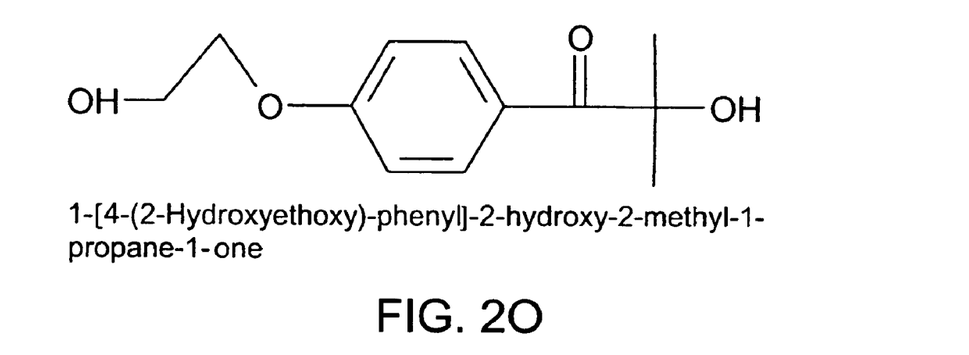
FIG. 2O shows the chemical structure of 1-[4-(2-hydroxyethoxy)-phenyl]-2-hydroxy-2-methyl-1-propane-1-one (molecular weight 224.3; Ciba Specialty Chemicals; Ciba® IRGACURE® 2959; CAS No. 106797-53-9).

More preferably, the photoinitiator comprises of a phobic photoinitiator capable of the preferential adsorption on the surface of the substrate. Exemplary photoinitiator molecules of this type include those shown in FIGS. 2A-2O.

Suitable photoinitiators are agents that can initiate radical crosslinking. Such agents are known in the art and include, but are not limited to, 1-[4-(2-Hydroxy)-phenyl]-2-hydroxy-2-methyl-1-propane-1-one (Ciba Irgacure 2959) and other related Irgacures; benzoin methyl ether; 1-hydroxycyclohexylphenyl ketone; and Darocur-related molecules, such as Darocur 1173.

Preferably, exposure to a reagent bath comprising a surface-modifying molecule and a photoinitiator is for a period of time from within about 0-10 minutes; longer coating periods may be used but are not necessary.

Crosslinking can be triggered by actinic radiation, such as, for example, by UV light, or ionizing radiation, such as, for example, gamma radiation or X-radiation.

Exposure to actinic radiation can be effected at room temperature for a time usually between about 1 to 120 seconds, and preferably, between about 5 and 60 seconds. Exposure converts the monomeric form of the difunctional surface-modifying molecules to polymers. Upon completion of crosslinking, the photoinitiator and excess monomer, if present, are removed from the composite porous membrane by rinsing in a suitable solvent. When the composite porous membrane is dried, it has essentially the same porous configuration as the original porous hydrophobic substrate.

While passive immersion (i.e., dipping, spraying, etc.) can be used to coat the substrate and generate porous composite membranes according to the invention, in one particularly preferred embodiment, an active method, such as a flow-through method is used.

Preferably, the substrate is placed in a flow device comprising a process chamber which contains the reagent bath. Solution comprising the difunctional surface-modifying molecules, solvent, and photoinitiator is forced through a hydrophobic substrate. The substrate may be supported on a porous support during this process or on a frame (e.g., such as the rim of the opening of a flask). Solution may be forced through the substrate using a pressure differential, e.g., such as by applying a vacuum and withdrawing the solution into a waste receptacle. Generally, the flow rate is optimized to achieve satisfactory coating levels (e.g., such as a maximum amount of hydrophilicity at the membrane surface for a minimum amount of surface modifying molecule). The membrane is then exposed to UV light to permit the surface-modifying molecules to polymerize and to crosslink. The membrane is then dried and can be stored until ready to use.

It is a discovery of the instant invention that a flow-through method of coating can be highly efficient in generating composite membranes. Much less surface-modifying molecules are used. For example, in comparison to passive immersion methods, for an incubation time of less than 5 minutes, less than about 0.5% of difunctional surface-modifying monomer can provide an effective coating, in comparison to levels of about 6-12% required in passive immersion methods.

The porous composite membranes treated according to the invention have greater liquid flow rates per unit area with equal particle retention as compared to a membrane treated by other treatment methods of prior art. This means that if a sample of a solution containing particles is passed through the membrane of the present invention and an equal volume sample of the same solution is passed through a membrane treated by conventional methods, both membranes will retain the same amount of material, but the membrane of the present invention will have a faster flow rate and process the liquid volume in a shorter time period. The composite porous membranes generated using the flow-through method described herein, have flow rates that equal those of the original phobic membrane in contrast to prior art membranes such as the one shown in FIG. 1A.

Preferably, the membranes can be wetted even after drying for at least 2 hours at 90° C. Wetting times range from about 0 to less than a minute, preferably, less than 30 seconds, and still more preferably, in less than about 15 seconds.

The composite membranes can be used in a variety of applications, including, but not limited to, liquid separation processes such as microfiltration, ultrafiltration, dialysis, capture and/or immobilization of biomolecules (e.g., nucleic acids, proteins, polypeptides, peptides, viruses, cells, and the like); as surfaces for implantation into the body (e.g., as part of an implantable medical device), or as surfaces incorporated into different devices. Additionally, the membranes can be configured in a variety of forms including, but not limited to, flat sheets, hollow fibers or tubes, and can be any shape.

EXAMPLES

The invention will now be further illustrated with reference to the following examples. It will be appreciated that what follows is by way of example only and that modifications to detail may be made while still falling within the scope of the invention.

Example 1

A hydrophobic PVDF microporous membrane, having an average pore size of 0.45 micron and average thickness of 120 microns, was rendered hydrophilic by treating with a reagent bath containing a difunctional acrylate monomer and a photoinitiator in 50/50 IPA water solvent mixture. The difunctional acrylate monomer was ethoxylated (30) bisphenol A diacrylate (Sartomer CD 9038) and the photoinitiator was 1-[4-(2-Hydroxy)-phenyl]-2-hydroxy-2-methyl-1-propane-1-one (Ciba Irgacure 2959). Three membrane samples were treated in a flow through mode while another 3 samples were treated in a passive immersion mode. The treated membranes were UV irradiated, washed and dried. The concentration used for the treatments and the wettability of the resulting membranes is listed in the following table. The total treatment time was equal to 5 minutes in both cases.

The results demonstrated an instant wetting of the flow-through treated membranes versus an uneven wetting, with a lot of phobic spots, in the case of the passively treated membranes, in spite of the difference of the concentration of the monomer used, which was half as much in the case of the flow through application.

| No | composition | treatment | Wettability after drying at 90° C., 18 hours |
|---|---|---|---|
| 1 | 0.5% CD9038; 1.5% Irgacure 2959; 50/50 H$_2$O/IPA | Flow-through | wet |
| 2 | 0.5% CD9038; 1.5% Irgacure 2959; 50/50 H$_2$O/IPA | Flow-through | wet |
| 3 | 0.5% CD9038; 1.5% Irgacure 2959; 50/50 H$_2$O/IPA | Flow-through | wet |
| 4 | 1% CD9038; 1.5% Irgacure 2959; 50/50 H$_2$O/IPA | passive | spotty |
| 5 | 1% CD9038; 1.5% Irgacure 2959; 50/50 H$_2$O/IPA | passive | spotty |
| 6 | 1% CD9038; 1.5% Irgacure 2959; 50/50 H$_2$O/IPA | passive | spotty |

Example 2

A polyvinylidene difluoride (PVDF) microporous membrane, having an average pore size of 0.2 micron and average thickness of 120 microns, is treated to produce a hydrophilic surface.

One set of 2 samples was treated in a flow-through mode with the reagent bath containing 1% of ethoxylated (30) bisphenol A diacrylate (Sartomer CD 9038) and 0.5% 1-[4-(2-Hydroxy)-phenyl]-2-hydroxy-2-methyl-1-propane-1-one (Ciba Irgacure 2959).

A second set of samples was treated in a flow-through mode with the reagent bath containing 1% of polyethylene glycol (400) diacrylate (Sartomer SR 344) and 0.5% 1-[4-(2-Hydroxy)-phenyl]-2-hydroxy-2-methyl-1-propane-1-one (Ciba Irgacure 2959).

Ethoxylated (30) bisphenol A diacrylate (Sartomer CD 9038) has a hydrophobic anchor and is capable of preferential adsorption on phobic substrates, while polyethylene glycol (400) diacrylate (Sartomer SR 344) is a totally hydrophilic molecule, and is not capable of a significant, preferential adsorption on the phobic substrates.

The membrane samples were pre-wetted with IPA and washed with water mixture before the treatment. The treated membranes were UV irradiated, washed and dried.

The results listed in the following table showed that monomers capable of the preferential adsorption can be used at concentration levels where other monomers do not work.

| No | composition | treatment | Wettability after drying at 90° C., 18 h |
|---|---|---|---|
| 1 | 1% CD9038; 0.5% Irgacure 2959 | Flow-through | wet |
| 2 | 1% CD9038; 0.5% Irgacure 2959; | Flow-through | wet |
| 3 | 1% SR344; 0.5% Irgacure 2959; | Flow-through | phobic |
| 4 | 1% SR344; 0.5% Irgacure 2959; | Flow-through | phobic |

Example 3

A PVDF microporous membrane, having an average pore size of 0.2 microns and average thickness of 120 microns, was treated to produce a hydrophilic surface. Two samples were treated in a flow through mode with the reagent bath containing 2% of ethoxylated (30) bisphenol A diacrylate (Sartomer CD 9038) and 0.5% Ciba Irgacure 2959 in 70/30 water/IPA solvent. The third sample was used as an untreated control. The treated membranes were UV irradiated, washed and dried.

The results after washing and drying of the membranes demonstrated an instant wetting of the flow-through treated membranes. The performance characteristics revealed no differences between treated and non-treated membranes.

| number | composition | treatment | Wettability after drying at 90° C., 18 hours | IPA bubble point |
|---|---|---|---|---|
| Control | NA | NA | phobic | 24 |
| 11 | 2% cd9038; 0.5% Irgacure 2959; 70/30 H$_2$O/IPA | Flow-through | wet | 24 |
| 12 | 2% cd9038; 0.5% Irgacure 2959; 70/30 H$_2$O/IPA | Flow-through | wet | 24 |

Example 4

A polyvinylidene difluoride (PVDF) microporous membrane, having an average pore size of 0.2 micron and average thickness of 120 microns was treated to produce a hydrophilic surface.

One set of 6 samples was treated in a flow-through mode with the reagent bath containing 2% ethoxylated (30) bisphenol A diacrylate (Sartomer CD 9038) and 0.125% 1-Hydroxy-cyclohexyl-phenyl-ketone (Ciba Irgacure 184) in an 85/15 water/IPA solvent.

A second set of samples was treated in a flow-through mode with the reagent bath containing 2% of ethoxylated (30) bisphenol A diacrylate (Sartomer CD 9038) and 0.25% 1-Hydroxy-cyclohexyl-phenyl-ketone (Ciba Irgacure 184) in 80/20 water/IPA solvent.

The membrane samples were pre-wetted with IPA and washed with a water/solvent mixture before the treatment. The treated membrane was UV irradiated, washed and dried.

The results listed in the following table show that it is possible to produce a hydrophilic membrane capable of withstanding extensive drying, and that it is possible to optimize the hydrophilization process by changing the compositions of the different reagent baths.

| No | Composition | Treatment | Wettability after drying at 90° C., 2 hours | Wettability after drying at 90° C., 18 hours |
|---|---|---|---|---|
| 1 | 2% cd9038; 0.125% Irgacure 184; 85/15 H$_2$O/IPA | Flow-through | instant | 15.7 ± 11.8 sec |
| 2 | 2% cd9038; 0.25% Irgacure 184; 80/20 H$_2$O/IPA | Flow-through | instant | 1.5 ± 1.6 sec |

Example 5

Three rolls of PVDF microporous membrane (600 ft each), having an average pore size of 0.45 micron and average thickness of 120 microns were treated to produce a hydrophilic surface. All 3 rolls were treated in a flow-through mode with the reagent bath containing 2% ethoxylated (30) bisphenol A diacrylate (Sartomer CD 9038) and 0.25% 1-Hydroxy-cyclohexyl-phenyl-ketone (Ciba Irgacure 184) in an 80/20 water/IPA solvent.

Treated membranes were UV-irradiated, washed and dried.

The results listed in the following table showed that it is possible to produce a hydrophilic membrane capable of withstanding both the extensive drying, and autoclaving, using very low concentrations of the chemicals. Results of the treatment were absolutely consistent throughout the whole length of the treated membrane.

WETTABILITY

| Sample | | Intact | 2 h, 90° C. | 18 h, 90° C. | 3 Autoclave Cycles |
|---|---|---|---|---|---|
| Roll 1 | 0 ft | instant | Instant | instant | instant |
| | 200 ft | instant | Instant | instant | instant |
| | 400 ft | instant | Instant | instant | instant |
| | 600 ft | instant | Instant | instant | instant |
| Roll 2 | 0 ft | instant | Instant | instant | instant |
| | 200 ft | instant | Instant | instant | instant |
| | 400 ft | instant | Instant | instant | instant |
| | 600 ft | instant | Instant | instant | instant |
| Roll 3 | 0 ft | instant | Instant | instant | instant |
| | 200 ft | instant | Instant | instant | instant |
| | 400 ft | instant | Instant | instant | instant |
| | 600 ft | instant | Instant | instant | instant |

Example 6

A supported polytetrafluoroethylene microporous membrane (PTFE), having an average pore size of 1 micron, and non-woven polypropylene (PP), having an average pore size of 0.5 micron, were treated to produce a hydrophilic surface.

Samples were treated in a flow-through mode with the reagent bath containing 2% of ethoxylated (30) bisphenol A diacrylate (Sartomer CD 9038) and 0.25% 1-Hydroxy-cyclohexyl-phenyl-ketone (Ciba Irgacure 184) in 80/20 water/IPA solvent.

The membrane samples were pre-wetted with IPA and washed with water before treatment. The treated membranes were UV irradiated, washed and dried.

The results listed in the following table showed that it is possible to produce a hydrophilic surface capable of withstanding extensive drying.

| No | Composition | Treatment | Wettability after drying at 90° C., 2 hours | Wettability after drying at 90° C., 18 hours |
|---|---|---|---|---|
| PTFE | 2% cd9038; 0.25% Irgacure 184; 80/20 $H_2O$/IPA | Flow-through | instant | instant |
| PP | 2% cd9038; 0.25% Irgacure 184; 80/20 $H_2O$/IPA | Flow-through | instant | instant |

Example 7

A polyvinylidene difluoride (PVDF) microporous membrane, having an average pore size of 0.45 micron and average thickness of 120 microns, was treated to produce a hydrophilic surface.

One set of 8 samples was treated in a flow-through mode with the reagent bath containing 2% of ethoxylated (30) bisphenol A diacrylate (Sartomer CD 9038) and 0.25% 1-Hydroxy-cyclohexyl-phenyl-ketone (Ciba Irgacure 184) in 80/20 water/IPA solvent.

The membrane samples were pre-wetted with IPA and washed with a water mixture before the treatment. The treated membranes were UV irradiated, washed and dried.

The second set of 8 samples was left untreated (phobic).

Wettability, water flow rate and IPA bubble point were measured for all the samples. The results listed in the following table showed that it is possible to produce a hydrophilic membrane capable of withstanding the extensive drying with virtually no change in the flow through efficiency.

| No | Composition | Wettability after drying at 90° C., 18 hours | Water flow rate cc/min/cm$^2$ | IPA bubble point psi |
|---|---|---|---|---|
| 1 | 2% cd9038; 0.25% Irgacure 184; 80/20 $H_2O$/IPA | instant | 52.78 ± 1.79 | 11.38 ± 0.21 |
| 2 | None | phobic | 51.14 ± 3.78 | 11.15 ± 0.18 |

All patent and non-patent publications cited in this specification are indicative of the level of skill of those skilled in the art to which this invention pertains. All these publications and patent applications are herein incorporated by reference to the same extent as if each individual publication or patent application was specifically and individually indicated as being incorporated by reference herein.

Those skilled in the art will recognize, or be able to ascertain, using no more than routine experimentation, numerous equivalents to the specific substances and procedures described herein. Such equivalents are considered to be within the scope of this invention, and are covered by the following claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A composite porous membrane comprising:
   a hydrophobic substrate having an average pore size ranging from about 0.01 μm to about 10 μm coated with difunctional surface-modifying molecules;
   each difunctional surface-modifying molecule comprising a hydrophobic portion preferentially associated with the substrate and a hydrophilic portion and having an active group containing a carbon-carbon double bond;
   the difunctional surface-modifying molecules consisting of a difunctional acrylate monomer;
   wherein the difunctional acrylate monomer comprises greater than about 90% of the molecules associated with the membrane;

wherein the substrate is coated by flowing a reagent solution through the substrate to coat the substrate surface and inner surfaces of the pores, the reagent solution consisting of the difunctional surface-modifying molecules, a solvent, and a photoinitiator, wherein the reagent is capable of flowing through the substrate; and wherein the surface-modifying molecules are crosslinked to form a crosslinked hydrophilic polymeric network at the substrate surface and inner surfaces of the pores of the membrane, and wherein the pore size of the coated membrane is substantially the same as the pore size of the porous membrane before coating.

2. The membrane according to claim 1, wherein the hydrophilic portion of the surface-modifying molecules comprises at least two crosslinking active groups.

3. The membrane according to claim 2, wherein the crosslinking active group comprises a carbon-carbon double bond.

4. The membrane according to claim 1, wherein 100% of molecules associated with the substrate comprise difunctional surface-modifying molecules.

5. The membrane according to claim 1, wherein the hydrophobic portion is a hydrophobic alkyl, aromatic group, or olefinic hydrocarbon group.

6. The membrane according to claim 1, wherein the hydrophobic portion comprises an aromatic hydrocarbon molecule.

7. The membrane according to claim 6, wherein the aromatic hydrocarbon comprises a bisphenol A group.

8. The membrane according to claim 1, wherein the hydrophobic portion does not form covalent bonds with the surface.

9. The membrane according to claim 1, wherein the hydrophilic portion is positively charged.

10. The membrane according to claim 1, wherein the hydrophilic portion is negatively charged.

11. The membrane according to claim 1, wherein the hydrophilic portion comprises a neutral charge.

12. The membrane according to claim 1, wherein the hydrophilic portion comprises the general formula [—$X_{n1}$—Y—CR=CH$_2$]$_{n2}$ where X is independently selected from the group consisting of (—CH2-CH2-O—); (—CH2-O—); (—CH2-CH(COOH)—); (—CH2-CH(OH)—); Y is selected from the group consisting of ([—CH2-]$_{n3}$); (—COO); $n_1$ is from about 1-50; $n_2$ is from about 1-2; and $n_3$ can be from about 1 to about 50.

13. The membrane according to claim 1, wherein the difunctional surface modifying molecules are polymerized on the substrate surface after being preferentially adsorbed with the substrate surface.

14. The membrane according to claim 1, wherein the difunctional surface molecules comprise ethoxylated (30) bisphenol A diacrylates.

15. The membrane according to claim 1, wherein the difunctional-surface molecules are polymerized using a photoinitiator, and wherein the photoinitiator is preferentially adsorbed by the substrate surface.

16. The membrane according to claim 1, wherein the difunctional-surface molecules are polymerized using a photoinitiator that comprises a substantially hydrophobic molecule.

17. The membrane according to claim 1, wherein the difunctional-surface molecules are polymerized using a photoinitiator selected from the group consisting of 1-hydroxy-cyclohexyl-phenyl-ketone; 2-benzyl-2-dimethylamino-1-(4-morpholinophenyl1)-butanone-1; 50% 1-hydroxy-cyclohexyl-phenyl-ketone and 50% benzophenone; 25% bis (2,6-dimethoxybenzoyl)-2,4,4-trimethyl pentylphosphineoxide and 75% 2-hydroxy-2-methyl-1-phenyl-propan-1-one; 2,2-dimethoxy-1,2-diphenylethan-1-one; bis(2,4,6-trimethylbenzoyl)-phenylphosphineoxide; 80% 2-hydroxy-2-methyl-1-phenyl-propan-1-one and 20% 1-hydroxy-cyclohexyl-phenyl-ketone; 25% bis(2,6-dimethoxybenzoyl)-2,4,4-trimethyl-pentylphosphineoxide and 75% 1-hydroxy-cyclohexyl-phenyl-ketone; 2-hydroxy-2-methyl-1-phenyl-propan-1-one; benzophenone; 50% 2,4,6-trimethylbenzoyl-diphenyl-phosphineoxide and 50% 2-hydroxy-2-methyl-1-phenyl-propan-1-one; bis(□5-2,4-cyclopentadien-1-yl)-bis(2,6-dicluoro-3-(1H-pyrrol-1-yl)-phenyl)titanium; 2-methyl-1[4-(methylthio)phenyl]-2-morpholinopropan-1-one; 30% 2-benxyl-2-dimethylamino-1-(4-morpholinophenyl)-butanone-1 and 70% 2,2-dimethoxy-1,2-diphenylethan-1-one; and 1-[4-(2-hydroxyethoxy)-phenyl]-2-hydroxy-2-methyl-1-propane-1-one.

18. The membrane according to claim 1, wherein the hydrophobic substrate comprises polyvinylidene fluoride.

19. The membrane according to claim 1, wherein the membrane is wettable within less than about 30 seconds after drying upon contacting with an aqueous solution.

20. The membrane according to claim 1, wherein the membrane is autoclavable.

21. The membrane according to claim 1, wherein the hydrophobic portion is capable of significant association with the substrate.

22. The membrane according to claim 1, wherein the coating is provided on the hydrophobic substrate by exposure to a reagent solution comprising less than 1% difunctional surface-modifying molecule.

23. The membrane according to claim 22, wherein the reagent solution comprises less than about 0.5% difunctional surface-modifying molecule.

24. The membrane according to claim 22, wherein the reagent solution comprises less than about 0.25% difunctional surface-modifying molecule.

25. The membrane according to claim 1, wherein the flow rate through the pores of the coated membrane is substantially the same as the flow rate through the pores of the non-coated membrane.

26. The membrane according to claim 25, wherein the flow rate through the pores of the coated membrane is at least about 93% of the flow rate through the pores of the non-coated membrane.

27. The membrane according to claim 25, wherein the flow rate through the pores of the coated membrane is at least about 96% of the flow rate through the pores of the non-coated membrane.

28. The membrane of claim 1 wherein the hydrophobic substrate has an average pore size of about 0.2 μm.

29. The membrane of claim 1 wherein the hydrophobic substrate has an average pore size of about 0.45 μm.

* * * * *